(12) United States Patent
Gomes et al.

(10) Patent No.: US 12,466,261 B2
(45) Date of Patent: Nov. 11, 2025

(54) CRASH HANDLING SYSTEM FOR AN AIRCRAFT

(71) Applicant: Lilium eAircraft GmbH, Wessling (DE)

(72) Inventors: Thalles Hermes Reis Gomes, Wessling (DE); Julian Carl, Wessling (DE); Pedro Manuel De La Camara Cruz, Wessling (DE)

(73) Assignee: Lilium eAircraft GmbH, Wessling (DE)

( * ) Notice: Subject to any disclaimer, the term of this patent is extended or adjusted under 35 U.S.C. 154(b) by 152 days.

(21) Appl. No.: 18/381,325

(22) Filed: Oct. 18, 2023

(65) Prior Publication Data

US 2024/0123826 A1    Apr. 18, 2024

(30) Foreign Application Priority Data

Oct. 18, 2022   (EP) .................................... 22202169

(51) Int. Cl.
*B60L 3/00* (2019.01)
*B64D 45/08* (2006.01)
*B64C 29/00* (2006.01)

(52) U.S. Cl.
CPC ............ *B60L 3/0007* (2013.01); *B64D 45/08* (2013.01); *B60L 2200/10* (2013.01); *B64C 29/0008* (2013.01)

(58) Field of Classification Search
CPC ... B60L 3/0007; B60L 2200/10; B64D 45/08; B64C 29/0008
See application file for complete search history.

(56) References Cited

U.S. PATENT DOCUMENTS

| 4,224,669 A * | 9/1980 | Brame | G01C 5/005 |
| | | | 701/8 |
| 4,916,448 A * | 4/1990 | Thor | G01S 13/86 |
| | | | 340/963 |

(Continued)

FOREIGN PATENT DOCUMENTS

| EP | 2969770 B1 | 8/2017 |
| WO | 2012165732 A1 | 8/2021 |

OTHER PUBLICATIONS

European Extended Search Report for corresponding European Patent Application No. 22202169.3, dated Mar. 23, 2023, 4 pp.

*Primary Examiner* — Gertrude Arthur Jeanglaude
(74) *Attorney, Agent, or Firm* — Meunier Carlin & Curfman LLC

(57) ABSTRACT

Disclosed is a crash handling system for an aircraft, comprising an altitude surveillance system adapted to receive altitude data from an altitude sensor and issue an altitude warning signal when a predetermined altitude condition is fulfilled, a crash detection unit, comprising an acceleration detector and issues a crash detection signal when a predetermined acceleration condition is fulfilled, a control unit operatively coupled to the altitude surveillance system and the crash detection unit to receive respective altitude warning signals and crash detection signals; and an energy storage system isolation means operatively coupled to the control unit to electrically isolate an energy storage system of the aircraft upon reception of an activation signal, wherein the control unit transitions from a disabled operation state to an enabled operation state when the altitude warning signal is received; and to issue the activation signal upon reception of the crash detection signal when in enabled state.

15 Claims, 2 Drawing Sheets

(56) References Cited

U.S. PATENT DOCUMENTS

Figure 1:
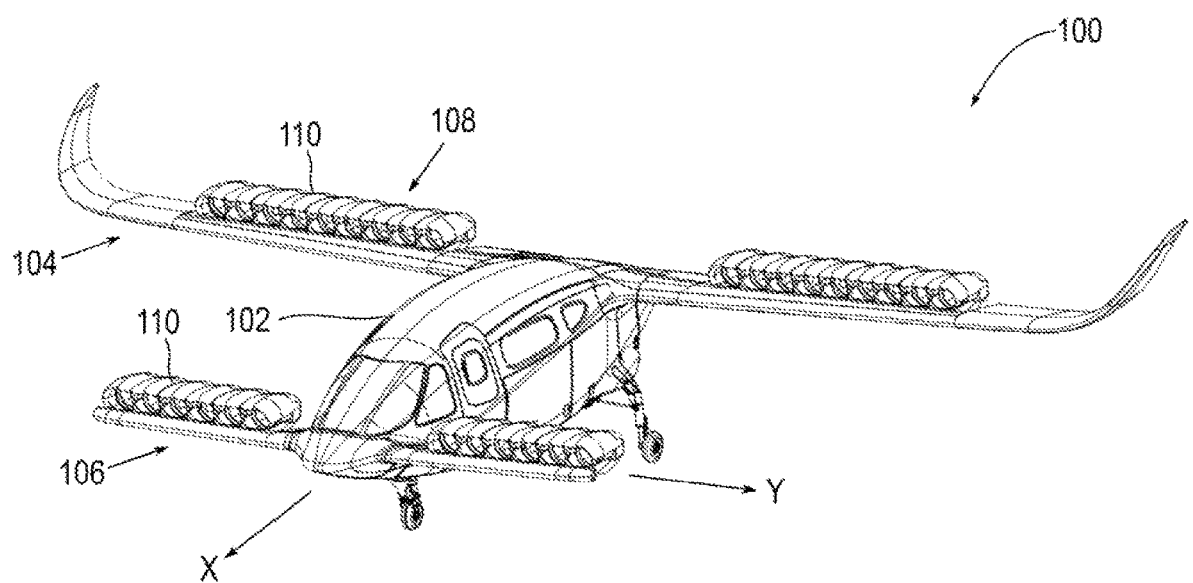

| | | | |
|---|---|---|---|
| 5,928,300 A * | 7/1999 | Rogers | B60R 21/0132 340/436 |
| 2001/0019089 A1 | 9/2001 | Happ | |
| 2011/0304202 A1 | 12/2011 | Tenhouten et al. | |

* cited by examiner

CRASH HANDLING SYSTEM FOR AN AIRCRAFT

CROSS REFERENCE TO RELATED APPLICATIONS

This application is a United States patent application claiming priority to European Patent Application No. 22202169.3 filed on Oct. 18, 2022.

The present invention relates to a crash handling system for an aircraft, an aircraft, comprising at least one energy storage system and such a crash handling system, and a method for operating such a crash handling system.

It has been proposed that in aircraft comprising large electrical energy storage systems with high capacities, such as electrically propelled vertical takeoff and landing (eVTOL) aircraft, dedicated crash handling systems should be incorporated for preventing serious injury to occupants or persons on the ground in case of major malfunctions. The release of high amounts of energy during crash landings, in which structural damages to the aircraft occur, such a crash handling system could help prevent the release of energy from the energy storing systems of the aircraft. It has also been proposed that any activation of said isolation of the energy storage system should be automatic, unless it is demonstrated to be impractical. In particular, the EASA has proposed a means of compliance (MOC) under the reference VTOL.2325(a)(4)5(d), in which said proposal has been laid out.

In order to perform an isolation of an energy storage system of a corresponding aircraft, a crash handling system has to be provided thereto which is able to identify a crash scenario and to issue a suitable signal, which can subsequently be interpreted by a corresponding aircraft system in order to perform the isolation of the energy storage system. For example, if a crash is confirmed, the energy storage system could instantly be disconnected from the remaining aircraft systems. Taking into account that such a complete disconnection of the energy storage system from the electrical systems of the aircraft, including propulsion and avionics systems, could have catastrophic consequences in case of a false positive crash detection during flight, the corresponding crash handling system has to be absolutely safe and reliable.

Since the above-identified means of compliance relates to a new category of aircraft, namely electrically propelled VTOL aircraft, the corresponding problem of providing a suitable crash handling system has not previously been addressed in the prior art. In particular, the batteries used in traditional aviation aircraft with combustion or jet engines do not have a comparable energy level as the energy storage systems required in eVTOL aircraft.

While thus no dedicated solutions exist for this problem in aviation, somewhat similar crash identification systems have been used in the automotive industry for airbag activation, however, there are certain substantial differences between the two use cases. For once, the mechanical loads of automobile crashes are expected to be much lower than in aviation. Also, the criticality associated with a false positive activation of such systems is much lower compared to aviation. In particular, the airbag inflation systems of automobiles usually rely on only a single unit that identifies a crash scenario based on mechanical triggers or electronic acceleration sensors. These components then interact with control devices executing certain algorithms to make the actual airbag deployment decision to ensure correct activation when needed.

Although such equipment could be adapted to aircraft use, a thorough assessment and optimization of safety and reliability would have to be performed. In addition, and considering the catastrophic consequences of potential failures, it appears necessary to extend and improve the devices and strategies used in the automotive industry in order to avoid a single point of failure in the crash handling system in aircraft.

In order to address the problem of providing a suitable crash handling system for an aircraft in accordance with the above-mentioned means of compliance, according to the present invention a crash handling system for an aircraft is proposed, comprising an altitude surveillance system, which is adapted to receive altitude data from at least one altitude sensor and to issue an altitude warning signal when a predetermined altitude condition is fulfilled, a crash detection unit, which comprises at least one acceleration detector and is adapted to issue a crash detection signal when a predetermined acceleration condition is fulfilled, a control unit which is operatively coupled to the altitude surveillance system and the crash detection unit in order to receive respective altitude warning signals and crash detection signals, and an energy storage system isolation means, which is operatively coupled to the control unit and adapted to electrically isolate an energy storage system of the aircraft upon reception of an activation signal. Furthermore, according to the present invention, the control unit is adapted to transition from a disabled operation state to an enabled operation state when the altitude warning signal is received and to issue a deactivation signal upon reception of the crash detection signal when in enabled state.

Thus, the present invention establishes a crash handling system, which is capable of safely identifying and reporting a crash landing in order for an energy storage system isolation to be performed. The addition of the altitude surveillance system and the corresponding enabled state of the control unit adds an extra layer of safety and avoids erroneous trigger events.

In addition to receiving the altitude data from the at least one altitude sensor, the altitude surveillance system of the crash handling system of the present invention may further be adapted to receive vertical velocity data from at least one velocity sensor. Thus, the predetermined altitude condition may not only depend on the current altitude of the aircraft but also its vertical velocity. In this context, more complex parameters may be derived from the corresponding input data, such as an estimated time until impact taking into account both the current altitude and the vertical velocity of the aircraft, which allows for an even higher predictive power and safety level of the system.

Furthermore, the control unit may additionally be adapted to remain in its enabled operation state for a predetermined time before transitioning back to the disabled operation state when the altitude warning signal is no longer received. Said predetermined time may for example be one second, which improves the robustness of the evaluation of data in the crash handling system and avoids operational states, in which the control unit transitions between its enabled and disabled states too frequently.

As already mentioned above, the predetermined altitude condition may relate to a minimum altitude above ground and/or an estimated time until impact. In particular, when evaluating the estimated time until impact, situations in which the aircraft hovers at low altitude above ground or is currently ascending will not lead to the control unit being in enabled operation state and thus provide a further safety measure of the system.

Concerning the crash detection unit, the predetermined acceleration condition may for example relate to an acceleration of more than a threshold acceleration value, such as for example 20 g, which is a value, which cannot be reached during normal operation of an aircraft or even extraordinary but still controllable situations such as emergency landings.

As also already briefly mentioned above, the present invention according to another aspect relates to an aircraft, comprising at least one energy storage system and a crash handling system as previously discussed. Therein, the energy storage system may be formed of any conceivable configuration of rechargeable battery cells, such as a number of battery modules each comprising a plurality of cells and/or super-modules each comprising a plurality of modules, controlled by a single battery management system or in a distributed manner by means of a multitude of battery management systems.

In particular, in the aircraft according to the present invention, the altitude surveillance system may be integrated with a terrain awareness warning system, TAWS, of the aircraft. Such systems are installed in any type of modern aircraft and are adapted to output a visual and/or acoustic alarm to the crew of the aircraft when flying too close to the ground. Thus, the present invention allows for an integration of a crash handling system and an already existing terrain awareness warning system of the aircraft in order to increase reliability and reduce costs.

While different configurations of the energy storage isolation means as well as the battery management systems of the at least one energy storage system are possible, in one particular example, the energy storage isolation means may be integrated with a battery management system of the at least one energy storage system. For example, the at least one battery management system may be configured to directly perform the electrical isolation of the energy storage system once the deactivation signal is received from the control unit of the crash handling system.

As also already mentioned above, the aircraft may be of the electrical propulsion vertical takeoff and landing (eVTOL) type.

According to another aspect, the present invention relates to a method for operating a crash handling system as discussed above in an aircraft according to the present invention, comprising the steps of, during flight of the aircraft, surveying the altitude of the aircraft, if the altitude of the aircraft fulfils a predetermined altitude condition, transitioning the control unit into its enabled operation state, surveying acceleration of the aircraft, and if the acceleration of the aircraft fulfils a predetermined acceleration condition while the control unit is in its enabled state, electrically isolating the at least one energy storage system of the aircraft.

Therein, both the altitude of the aircraft and the acceleration of the aircraft can be monitored during the entire flight of the aircraft, for example in a periodic manner with a frequency in the seconds and/or milliseconds range.

As discussed above in the context of the system according to the present invention, in addition to the altitude of the aircraft, a vertical velocity thereof may also be surveyed. Furthermore, the method according to the present invention may comprise transitioning the control unit back into its disabled state after a predetermined time when the altitude of the aircraft no longer fulfils the predetermined altitude condition. It would of course also be possible to immediately transition the control unit back to said disabled state once the altitude warning signal is no longer received, such that said predetermined time may also be zero.

As also discussed above in the context of the crash handling system according to the present invention, in a similar manner, in the method according to the invention the predetermined altitude condition may relate to a minimum altitude above ground and/or an estimated time until impact and/or the predetermined acceleration condition may relate to an acceleration of more than a threshold acceleration value, such as for example 20 g.

Figure 2:
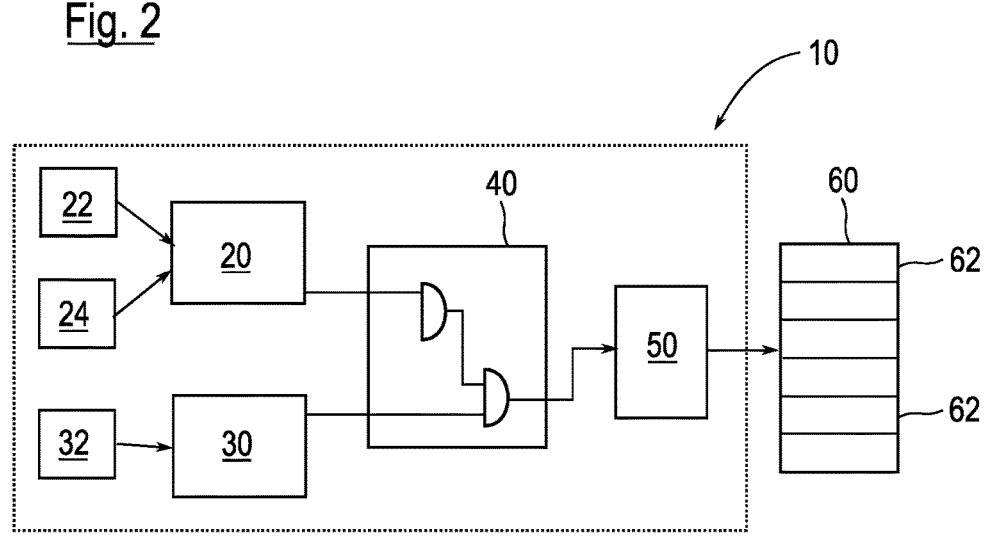
Figures 3, 4:
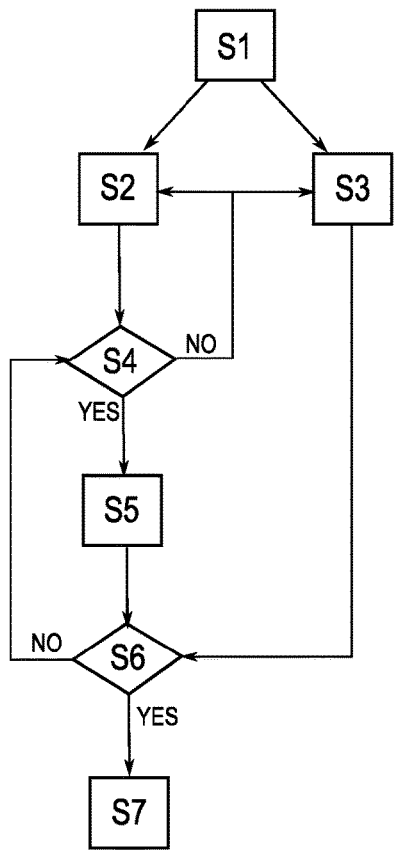

Further features and advantages of the present invention will become even clearer from the following description of an embodiment thereof when taken together with the accompanying drawings. Said drawings in particular show:

FIG. 1 an isometric view of a VTOL aircraft according to the present invention;

FIG. 2 a schematic view of the crash handling system employed in the aircraft of FIG. 1;

FIG. 3 a flowchart of a method for operating the crash handling system of FIG. 2; and FIG. 4 a table representing a time sequence when handling a crash with the system of FIG. 2

In FIG. 1, a VTOL aircraft according to the present invention is shown and generally denoted with reference numeral 100. The aircraft 100 comprises a fuselage 102, a pair of wings 104 and a pair of canard wings 106 positioned in front of the wings 104 with respect to the main horizontal flying direction X of the aircraft 100.

To each of the wings 104 and the canard wings 106, a plurality of propulsion unit structures 108 are connected by means of dedicated attachment assemblies, which allow for pivoting of propulsion motors 110 integrated with the propulsion unit structures 108 with respect to the wings 104 or canard wings 106 around respective axes Y, which substantially correspond to the width direction of the aircraft 100. Each of said propulsion unit structures 108 is formed as a flap pivotably mounted at the trailing edges of the respective wings 104 or canard wings 106 and carrying at least one propulsion motor 110. Herein, the propulsion motors 110 may be formed by electrically driven rotors, in particular in ducted fan configurations.

While not detailed in FIG. 1, the aircraft 100 also comprises a crash handling system 10 as illustrated in FIG. 2. Said crash handling system 10 comprises an altitude surveillance system 20, which is adapted to receive altitude data from at least one altitude sensor 22 as well as vertical velocity data from at least one velocity sensor 24. Said altitude surveillance system 20 of the aircraft 100 may be integrated with a terrain awareness warning system, TAWS, of the aircraft 100 in that it the two systems may share the sensors 22, 24 altitude surveillance system 20 may directly use data output by the TAWS of the aircraft 100. Furthermore, the system 10 comprises a crash detection unit 30, which comprises at least one acceleration detector 32 and is adapted to issue a crash detection signal when a predetermined acceleration condition is fulfilled.

For the purpose of evaluating the altitude warning signals as well as crash detection signals issued by the altitude surveillance system 20 and the crash detection unit 30, respectively, the system 10 further comprises a control unit 40, which is operatively coupled to both of the altitude surveillance system 20 and the crash detection unit 30 in order to receive said signals. The control unit 40 is adapted to be able to transition from a disabled operation state to an enabled operation state when the altitude warning signal is received and to issue a deactivation signal upon reception of the crash detection signal when it is in its enabled state.

Said activation signal is issued to an energy storage system isolation means 50, which is operatively coupled to an energy storage system 60 of the aircraft 100 comprising a plurality of individual battery modules 62, wherein the energy storage system isolation 50 may be integrated with one or more battery management systems of the energy storage system 60.

Next, in FIG. 3, a flow chart of a method according to the present invention is shown, wherein in step S1, the aircraft 100 of FIG. 1 takes flight, upon which during the flight of the aircraft 100, the altitude and vertical velocity of the aircraft 100 are surveyed in step S2 by the altitude sensor 22 and the velocity sensor 24 of the altitude surveillance system 20, respectively. Concurrently, in step S3, the output of the acceleration detector 32 is monitored by the crash detection system 30 of the aircraft 100 and it is evaluated whether a predetermined acceleration condition is fulfilled.

In step S4, it is decided whether the altitude and vertical velocity of the aircraft fulfil a predetermined altitude condition, and if this is not the case (NO), the process returns to steps S2 and S3. If, on the other hand, the predetermined altitude condition is fulfilled (YES), in step S5 the control unit 40 transitions into its enabled operation state and the process proceeds to step S6.

In said step S6, the output of the crash detection system 30 of step S3 concerning whether the predetermined acceleration condition is fulfilled is received. If this should not be the case (NO), the process will transition the control unit 40 to its disabled state and return to step S4 in order to evaluate whether the predetermined altitude condition is still fulfilled. It shall be noted at this point that the process may repeat the operation of step S6 for a predetermined amount of time, such as for example one second, during which the control unit 40 remains in its enabled state and periodically the output from the crash detection system 30 of step S3 is evaluated before the process returns to step S4 and transitions the control unit 40 back to its disabled state.

Finally, in case in step S6 the output of the crash detection systems 30 reveals that the predetermined acceleration condition is fulfilled while the control unit 40 is in its enabled state (YES), the process proceeds to step S7 and the control unit outputs an activation signal which will trigger the energy storage isolation means 50 to electrically isolate the energy storage system 60 of the aircraft 100.

Lastly, in FIG. 4, a table representing an example embodiment of a time sequence when handling a crash with the system of FIG. 2 is shown. The sequence begins at the moment of a crash, such that the system has already been transitioned into its enabled operation state as previously an altitude warning signal has been received by the control unit 40. The detection of the crash itself by the crash detection unit requires about 5 ms, with the transmission of the corresponding data taking another millisecond. Thereafter, the processing of the data and the determination of the corresponding by the battery management systems is completed within 10 ms. Finally, the transmission of the activation signal and opening of the dedicated electrical connections takes another 3 ms, such that the isolation (ISO) of the at least one energy storage systems is completed after in total 19 ms. It is thus obvious that by implementing the present invention and in particular the enabled operation state as a prerequisite for isolating the energy storage system, the corresponding disconnection can be performed in an extremely quick and reliable manner.

The invention claimed is:

1. A crash handling system for an aircraft, comprising:
an altitude surveillance system, which is adapted to receive altitude data from at least one altitude sensor and to issue an altitude warning signal when a predetermined altitude condition is fulfilled;
a crash detection unit, which comprises at least one acceleration detector and is adapted to issue a crash detection signal when a predetermined acceleration condition is fulfilled;
a control unit, which is operatively coupled to the altitude surveillance system and the crash detection unit and is configured to receive the altitude warning signal and the crash detection signal; and
an energy storage system isolation means, which is operatively coupled to the control unit and adapted to electrically isolate an energy storage system of the aircraft upon reception of an activation signal;
wherein the control unit is adapted to transition from a disabled operation state to an enabled operation state when the altitude warning signal is received; and
to issue the activation signal upon reception of the crash detection signal when in the enabled operation state.

2. The crash handling system according to claim 1, wherein the altitude surveillance system is further adapted to receive vertical velocity data from at least one velocity sensor.

3. The crash handling system according to claim 1 wherein the control unit is further adapted to remain in the enabled operation state for a predetermined time before transitioning back to the disabled operation state when the altitude warning signal is no longer received.

4. The crash handling system according to claim 1, wherein the predetermined altitude condition relates to a minimum altitude above ground and/or an estimated time until impact.

5. The crash handling system according to claim 1, wherein the predetermined acceleration condition relates to an acceleration of more than a threshold acceleration value, such as for example 20 g.

6. An aircraft comprising at least one energy storage system and a crash handling system according to claim 1.

7. The aircraft according to claim 6, wherein the altitude surveillance system is integrated with a terrain awareness warning system, TAWS, of the aircraft.

8. The aircraft according to claim 6, wherein the TAWS is further adapted to issue an audible or visual warning when the predetermined altitude condition is fulfilled.

9. The aircraft according to claim 6, wherein the energy storage isolation means is integrated with a battery management system of the at least one energy storage system.

10. The aircraft according to claim 6, wherein the aircraft is of the electrical propulsion vertical take-off and landing type.

11. A method for operating a crash handling system in an aircraft according to claim 6, comprising the steps:
during flight of the aircraft, surveying the altitude of the aircraft,
if the altitude of the aircraft fulfils a predetermined altitude condition, transitioning the control unit into its enabled operation state;
surveying acceleration of the aircraft, and
if the acceleration of the aircraft fulfils a predetermined acceleration condition while the control unit is in its enabled state, electrically isolating the at least one energy storage system of the aircraft.

12. The method according to claim 11, wherein in addition to the altitude of the aircraft, a vertical velocity thereof is also surveyed.

13. The method according to claim 11, further comprising transitioning the control unit back into disabled state after a predetermined time when the altitude of the aircraft no longer fulfils the predetermined altitude condition.

14. The method according to claim 11, wherein the predetermined altitude condition relates to a minimum altitude above ground and/or an estimated time until impact.

15. The method according claim 11, wherein the predetermined acceleration condition relates to an acceleration of more than a threshold acceleration value, such as for example 20 g.

* * * * *